US006594953B2

(12) United States Patent
Weder et al.

(10) Patent No.: US 6,594,953 B2
(45) Date of Patent: Jul. 22, 2003

(54) FLOWER POT WITH ATTACHED SLEEVE AND METHOD OF USE

(75) Inventors: Donald E. Weder, Highland, IL (US); William F. Straeter, Highland, IL (US)

(73) Assignee: Southpac Trust International Inc.

( * ) Notice: Subject to any disclaimer, the term of this patent is extended or adjusted under 35 U.S.C. 154(b) by 0 days.

(21) Appl. No.: 10/341,029

(22) Filed: Jan. 10, 2003

(65) Prior Publication Data

US 2003/0101647 A1 Jun. 5, 2003

Related U.S. Application Data

(63) Continuation of application No. 09/864,387, filed on May 24, 2001, now abandoned, which is a continuation-in-part of application No. 09/732,625, filed on Dec. 8, 2000.

(51) Int. Cl.[7] ............................................... A01G 23/02
(52) U.S. Cl. ................................................................. 47/75
(58) Field of Search .................................... 47/72, 75

(56) References Cited

U.S. PATENT DOCUMENTS

| | | |
|---|---|---|
| 524,219 A | 8/1894 | Schmidt |
| 732,889 A | 7/1903 | Paver |
| 950,785 A | 3/1910 | Pene |
| 1,044,260 A | 11/1912 | Schloss |
| 1,063,154 A | 5/1913 | Bergen |
| 1,446,563 A | 2/1923 | Hughes |
| 1,520,647 A | 12/1924 | Hennigan |
| 1,525,015 A | 2/1925 | Weeks |
| 1,610,652 A | 12/1926 | Bouchard |
| 1,697,751 A | 1/1929 | Blake ........................ 229/87 |
| 1,794,212 A | 2/1931 | Snyder |
| 1,811,574 A | 6/1931 | Barrett |
| 1,863,216 A | 6/1932 | Wordingham |
| 1,978,631 A | 10/1934 | Herrlinger ..................... 91/68 |
| 2,048,123 A | 7/1936 | Howard ........................ 229/87 |

(List continued on next page.)

FOREIGN PATENT DOCUMENTS

| | | |
|---|---|---|
| AU | 4231978 | 6/1979 |
| BE | 654427 | 1/1965 |
| CH | 560532 | 4/1975 |
| DE | 15550 | 6/1900 |
| DE | 345464 | 12/1921 |
| DE | 513971 | 11/1930 |
| DE | 1166692 | 3/1964 |
| DE | 1962947 | 6/1971 |
| DE | 2060812 | 11/1971 |
| DE | 2748626 | 5/1979 |
| DE | 3445799 | 6/1986 |
| DE | 3829281 | 5/1989 |

(List continued on next page.)

OTHER PUBLICATIONS

Speed Cover Brochure, "The Simple Solution For Those Peak Volume Periods", Highland Supply Corporation, ©1989.
"Speed Sheets and Speed Rolls" Brochure, Highland Supply Corporation, ©1990.
"Color Them Happy with Highlander Products" ©1992.
"Costa Keeps the Christmas Spirit", Supermarket Floral, Sep. 15, 1992.

(List continued on next page.)

Primary Examiner—Charles T. Jordan
Assistant Examiner—Francis T. Palo
(74) Attorney, Agent, or Firm—Dunlap, Codding, Codding & Rogers

(57) ABSTRACT

A floral container, such as a flower pot, having a sleeve bondingly connected to an inner surface of the flower pot, together forming a pot assembly for cultivating, displaying or shipping a botanical item disposed therein.

12 Claims, 3 Drawing Sheets

U.S. PATENT DOCUMENTS

| | | | |
|---|---|---|---|
| RE21,065 E | 5/1939 | Copeman | 93/2 |
| 2,170,147 A | 8/1939 | Lane | 206/56 |
| 2,200,111 A | 5/1940 | Bensel | 229/1.5 |
| 2,278,673 A | 4/1942 | Savada et al. | 154/43 |
| 2,302,259 A | 11/1942 | Rothfuss | 41/10 |
| 2,323,287 A | 7/1943 | Amberg | 229/53 |
| 2,355,559 A | 8/1944 | Renner | 229/8 |
| 2,371,985 A | 3/1945 | Freiberg | 206/46 |
| 2,411,328 A | 11/1946 | MacNab | 33/12 |
| 2,510,120 A | 6/1950 | Leander | 117/122 |
| 2,529,060 A | 11/1950 | Trillich | 117/68.5 |
| 2,621,142 A | 12/1952 | Wetherell | 154/117 |
| 2,648,487 A | 8/1953 | Linda | 229/55 |
| 2,688,354 A | 9/1954 | Berger | 150/28 |
| 2,774,187 A | 12/1956 | Smithers | 47/41 |
| 2,822,287 A | 2/1958 | Avery | 117/14 |
| 2,846,060 A | 8/1958 | Yount | 206/58 |
| 2,850,842 A | 9/1958 | Eubank, Jr. | 47/58 |
| 2,883,262 A | 4/1959 | Borin | 21/56 |
| 2,989,828 A | 6/1961 | Warp | 53/390 |
| 3,022,605 A | 2/1962 | Reynolds | 47/58 |
| 3,080,680 A | 3/1963 | Reynolds | 47/37 |
| 3,094,810 A | 6/1963 | Kalpin | 47/37 |
| 3,121,647 A | 2/1964 | Harris et al. | 118/202 |
| 3,130,113 A | 4/1964 | Silman | 161/97 |
| 3,271,922 A | 9/1966 | Wallerstein et al. | 53/3 |
| 3,293,100 A | 12/1966 | Questel | |
| 3,316,675 A | 5/1967 | Cartwright, Jr. | |
| 3,322,325 A | 5/1967 | Bush | 229/62 |
| 3,376,666 A | 4/1968 | Leonard | 47/41 |
| 3,380,646 A | 4/1968 | Doyen et al. | 229/57 |
| 3,431,706 A | 3/1969 | Stuck | 53/390 |
| 3,508,372 A | 4/1970 | Wallerstein et al. | 53/3 |
| 3,510,054 A | 5/1970 | Sanni et al. | 229/66 |
| 3,512,700 A | 5/1970 | Evans et al. | 229/53 |
| 3,550,318 A | 12/1970 | Remke et al. | 47/37 |
| 3,552,059 A | 1/1971 | Moore | 47/41.12 |
| 3,554,434 A | 1/1971 | Anderson | 229/55 |
| 3,556,389 A | 1/1971 | Gregoire | 229/53 |
| 3,557,516 A | 1/1971 | Brandt | 53/14 |
| 3,620,366 A | 11/1971 | Parkinson | 206/59 |
| 3,681,105 A | 8/1972 | Milutin | 117/15 |
| 3,767,104 A | 10/1973 | Bachman et al. | 229/7 |
| 3,793,799 A | 2/1974 | Howe | 53/32 |
| 3,869,828 A | 3/1975 | Matsumoto | 47/34.11 |
| 3,888,443 A | 6/1975 | Flanigen | 248/152 |
| 3,962,503 A | 6/1976 | Crawford | 428/40 |
| 4,043,077 A | 8/1977 | Stonehocker | 47/66 |
| 4,054,697 A | 10/1977 | Reed et al. | 428/40 |
| 4,091,925 A | 5/1978 | Griffo et al. | 206/423 |
| 4,113,100 A | 9/1978 | Soja et al. | 206/602 |
| 4,118,890 A | 10/1978 | Shore | 47/28 |
| 4,149,339 A | 4/1979 | Hall et al. | 47/67 |
| 4,189,868 A | 2/1980 | Tymchuck et al. | 47/84 |
| 4,216,620 A | 8/1980 | Weder et al. | 47/72 |
| 4,223,480 A * | 9/1980 | Welty | 47/65.6 |
| 4,248,347 A | 2/1981 | Trimbee | 206/423 |
| D259,333 S | 5/1981 | Charbonneau | D9/306 |
| 4,265,049 A | 5/1981 | Gorewitz | 47/26 |
| 4,280,314 A | 7/1981 | Stuck | 53/241 |
| 4,297,811 A | 11/1981 | Weder | 47/72 |
| 4,333,267 A | 6/1982 | Witte | 47/84 |
| 4,347,686 A | 9/1982 | Wood | 47/73 |
| 4,380,564 A | 4/1983 | Cancio et al. | 428/167 |
| 4,400,910 A | 8/1983 | Koudstall et al. | 47/84 |
| 4,413,725 A | 11/1983 | Bruno et al. | 206/45.33 |
| 4,508,223 A | 4/1985 | Catrambone | 206/423 |
| D279,279 S | 6/1985 | Wagner | D11/143 |
| 4,546,875 A | 10/1985 | Zweber | 206/0.82 |
| 4,621,733 A | 11/1986 | Harris | 206/423 |
| 4,640,079 A | 2/1987 | Stuck | 53/390 |
| 4,717,262 A | 1/1988 | Roen et al. | 383/120 |
| 4,733,521 A | 3/1988 | Weder et al. | 53/580 |
| 4,765,464 A | 8/1988 | Ristvedt | 206/0.82 |
| 4,771,573 A | 9/1988 | Stengel | 47/67 |
| 4,773,182 A | 9/1988 | Weder et al. | 47/72 |
| 4,801,014 A | 1/1989 | Meadows | 206/423 |
| 4,810,109 A | 3/1989 | Castel | 383/105 |
| 4,835,834 A | 6/1989 | Weder | 29/525 |
| D301,991 S | 7/1989 | Van Sant | D11/149 |
| 4,900,390 A | 2/1990 | Colten et al. | 156/291 |
| 4,941,572 A | 7/1990 | Harris | 206/423 |
| 4,946,290 A | 8/1990 | Matyja | 383/10 |
| 4,980,209 A | 12/1990 | Hill | 428/34.1 |
| 4,989,396 A | 2/1991 | Weder et al. | 53/397 |
| D315,700 S | 3/1991 | Stephens | D11/151 |
| 5,073,161 A | 12/1991 | Weder et al. | 493/154 |
| 5,074,675 A | 12/1991 | Osgood | 383/122 |
| 5,076,011 A | 12/1991 | Stehouwer | |
| 5,098,634 A * | 3/1992 | Robbins, III | 264/154 |
| 5,105,599 A | 4/1992 | Weder | 53/399 |
| 5,108,195 A * | 4/1992 | Perron | 220/495.11 |
| 5,111,638 A | 5/1992 | Weder | 53/397 |
| 5,117,584 A | 6/1992 | Ottenwalder | |
| 5,120,382 A | 6/1992 | Weder | 156/212 |
| 5,152,100 A | 10/1992 | Weder et al. | 47/72 |
| 5,174,061 A * | 12/1992 | Dambricourt | 47/72 |
| 5,181,364 A | 1/1993 | Weder | 53/397 |
| D335,105 S | 4/1993 | Ottenwalder et al. | D11/164 |
| 5,199,242 A | 4/1993 | Weder et al. | 53/397 |
| 5,205,108 A | 4/1993 | Weder et al. | 53/397 |
| 5,228,234 A | 7/1993 | de Klerk et al. | 47/41.01 |
| 5,235,782 A | 8/1993 | Landau | 47/72 |
| 5,239,775 A | 8/1993 | Landau | 47/72 |
| 5,249,407 A | 10/1993 | Stuck | 53/399 |
| 5,259,106 A | 11/1993 | Weder et al. | 29/469.5 |
| 5,307,606 A | 5/1994 | Weder | 53/410 |
| 5,315,785 A | 5/1994 | Avôt et al. | 47/72 |
| 5,350,240 A | 9/1994 | Billman et al. | 383/104 |
| 5,353,575 A | 10/1994 | Stepanek | 53/461 |
| 5,361,482 A | 11/1994 | Weder et al. | 29/469 |
| 5,363,592 A * | 11/1994 | Weder et al. | 47/65.7 |
| 5,388,695 A | 2/1995 | Gilbert | 206/423 |
| 5,428,939 A | 7/1995 | Weder et al. | 53/397 |
| 5,443,670 A | 8/1995 | Landau | 156/191 |
| 5,493,809 A | 2/1996 | Weder et al. | 47/72 |
| D368,025 S | 3/1996 | Sekerak et al. | D9/305 |
| 5,496,251 A | 3/1996 | Cheng | 493/224 |
| 5,496,252 A | 3/1996 | Gilbert | 493/224 |
| 5,526,932 A | 6/1996 | Weder | 206/423 |
| 5,551,570 A | 9/1996 | Shaffer et al. | 206/575 |
| 5,572,849 A | 11/1996 | Weder et al. | 53/399 |
| 5,572,851 A * | 11/1996 | Weder | 53/390 |
| 5,575,133 A | 11/1996 | Weder et al. | 53/397 |
| 5,592,776 A * | 1/1997 | Weder | 206/423 |
| 5,617,703 A | 4/1997 | Weder | 53/413 |
| 5,624,320 A | 4/1997 | Martinez | 472/51 |
| 5,625,979 A | 5/1997 | Weder | |
| 5,647,168 A | 7/1997 | Gilbert | 47/72 |
| 5,647,193 A | 7/1997 | Weder et al. | 53/465 |
| 5,706,605 A | 1/1998 | Alcazar | 47/65.7 |
| 5,715,944 A | 2/1998 | Windisch | 206/423 |
| 5,735,103 A | 4/1998 | Weder | 53/399 |
| 5,758,472 A | 6/1998 | Weder | |
| 5,813,194 A | 9/1998 | Weder | 53/399 |
| D404,684 S | 1/1999 | Shea | D11/164 |
| 5,924,241 A | 7/1999 | Hodge | 47/72 |
| 5,941,020 A | 8/1999 | Weder | 47/72 |
| 5,966,866 A | 10/1999 | Ferguson | 47/41.01 |
| 5,974,730 A | 11/1999 | Chien | 47/41.01 |
| D419,436 S | 1/2000 | Celtorius et al. | D9/305 |

| | | | | |
|---|---|---|---|---|
| 6,009,687 A | 1/2000 | Weder .................. 53/399 |
| 6,047,524 A | 4/2000 | Weder .................. 53/399 |
| D424,972 S | 5/2000 | Ferguson ............ D11/143 |
| 6,098,336 A | 8/2000 | Ferguson ............. 206/423 |
| 6,129,208 A | 10/2000 | Ferguson ............. 206/423 |
| 6,129,209 A | 10/2000 | Tchira ................. 206/423 |
| 6,141,906 A | 11/2000 | Weder ..................... 47/72 |
| 6,161,332 A * | 12/2000 | Avot ....................... 47/81 |
| 6,182,395 B1 | 2/2001 | Weder ..................... 47/72 |
| 6,183,590 B1 | 2/2001 | Weder ..................... 47/72 |
| 6,227,439 B1 * | 5/2001 | Hansen ................ 229/104 |
| 6,398,411 B2 * | 6/2002 | Metzger ............ 220/495.11 |

FOREIGN PATENT DOCUMENTS

| | | | | |
|---|---|---|---|---|
| DE | 3911847 | 10/1990 | | |
| EP | 0050990 | 5/1982 | | |
| EP | 0791543 | 8/1997 | | |
| FR | 1376047 | 9/1964 | | |
| FR | 2036163 | 12/1970 | | |
| FR | 2137325 | 12/1972 | | |
| FR | 2272914 | 12/1975 | | |
| FR | 2489126 | 3/1982 | | |
| FR | 2567068 | 7/1984 | | |
| FR | 2610604 | 8/1988 | | |
| FR | 2603159 | 3/1989 | | |
| FR | 2619698 | 3/1989 | | |
| GB | 5605 | 5/1885 | | |
| GB | 1204647 | 9/1970 | | |
| GB | 2056410 | 3/1981 | | |
| GB | 2074542 | 11/1981 | | |
| GB | 2128083 | 4/1984 | | |
| GB | 2203127 | 10/1988 | | |
| GB | 2212136 | 7/1989 | | |
| GB | 2252708 | 8/1992 | | |
| GB | 2360434 A * | 9/2001 | ............ | A01G/9/02 |
| IT | 224507 | 4/1996 | | |
| JP | 542958 | 2/1993 | | |
| JP | 6127555 | 5/1994 | | |
| JP | 8-19334 | 1/1996 | | |
| NL | 8301709 | 12/1984 | | |
| NL | 1000658 | 1/1996 | | |
| WO | 9315979 | 8/1993 | | |
| WO | 9712819 | 4/1997 | | |

OTHER PUBLICATIONS

"Super Seller", Supermarket Floral, Sep. 15, 1992.

"Halloween", Link Magazine, Sep. 1992.

"Now More Than Ever", Supermarket Floral, Sep. 15, 1992.

Le Plant Sac Advertisement, published prior to Sep. 26, 1987.

"A World of Cut Flower and Pot Plant Packaging" Brochure, Klerk's Plastic Products Manufacturing, Inc., published prior to Mar. 31, 1994, 6 pages.

Chantler & Chantler brochure showing Zipper Sleeve™ and Florasheet®, published prior to Mar. 31, 1994, 2 pages.

"Stand Alone Plastic Bagmaking " brochure, AMI, Atlanta, GA, Feb. 15, 1996, 2 pages.

"Foil Jackets" brochure, Custom Medallion, Inc., Dec., 1996, 2 pages.

"Derwent Abstract" of FR 2610604A. It is noted that the abstract is an incorrect English translation of the contents of the French patent. The French patent does not enable or disclose adhesively attaching the covering to the container. 1988.

"Silver Linings" Brochure, Affinity Diversified Industries, Inc., 1986. The Silver Linings brochure shows a floral sleeve with a closed bottom. The brochure shows , in one embodiment, a vase with flowers inside a "cut flower" sleeve with the sleeve tied with a ribbon about the neck of the vase.

"Special Occasion Printed Highlophane Bags" Brochure, Highland Supply Corporation, 1990, 2 pages.

"Creative Packaging" Brochure, John Henry Company, Sep. 1992.

"Make Highlander Your Headquarters" Brochure, Highland Supply Corporation, 1991.

* cited by examiner

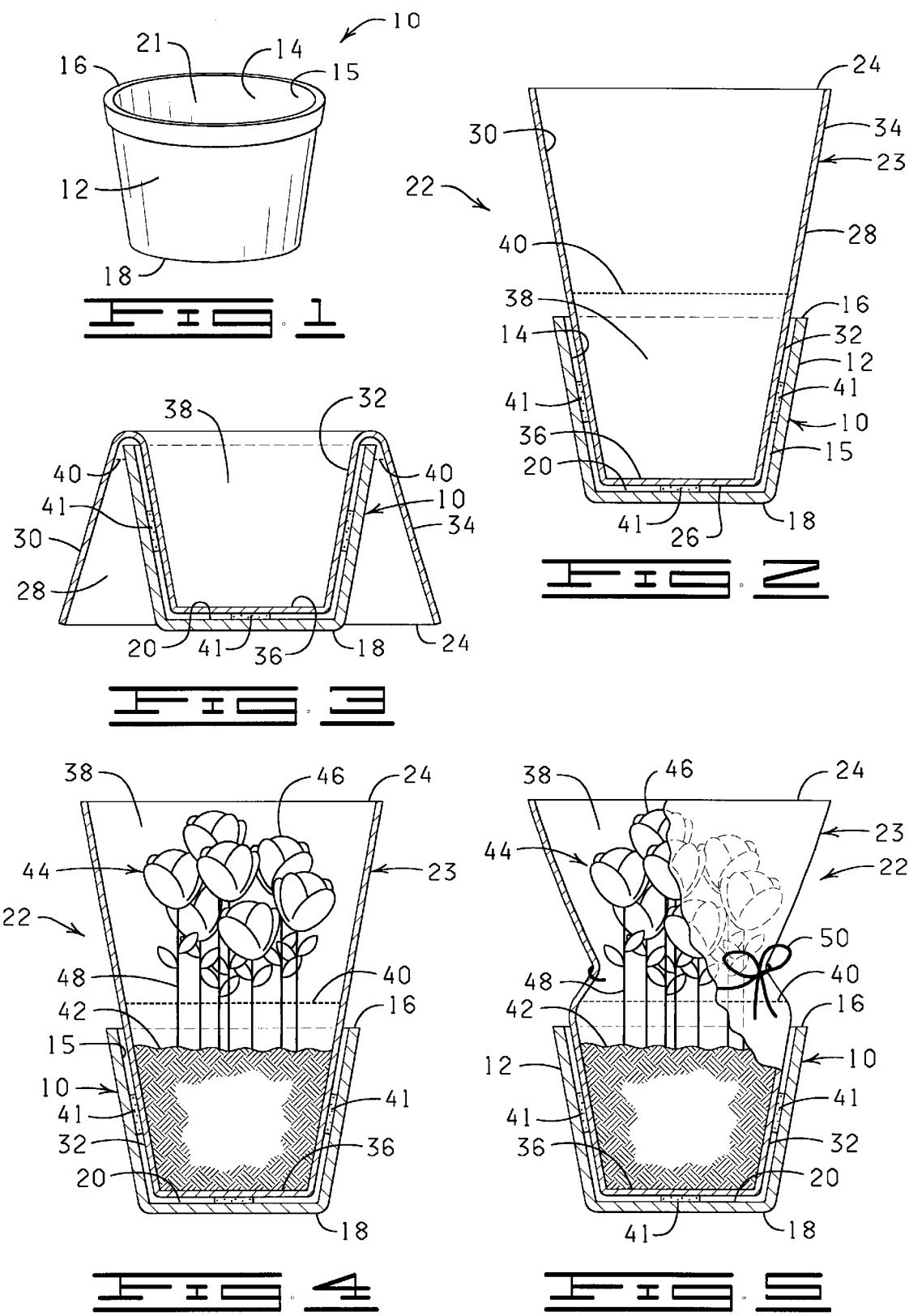

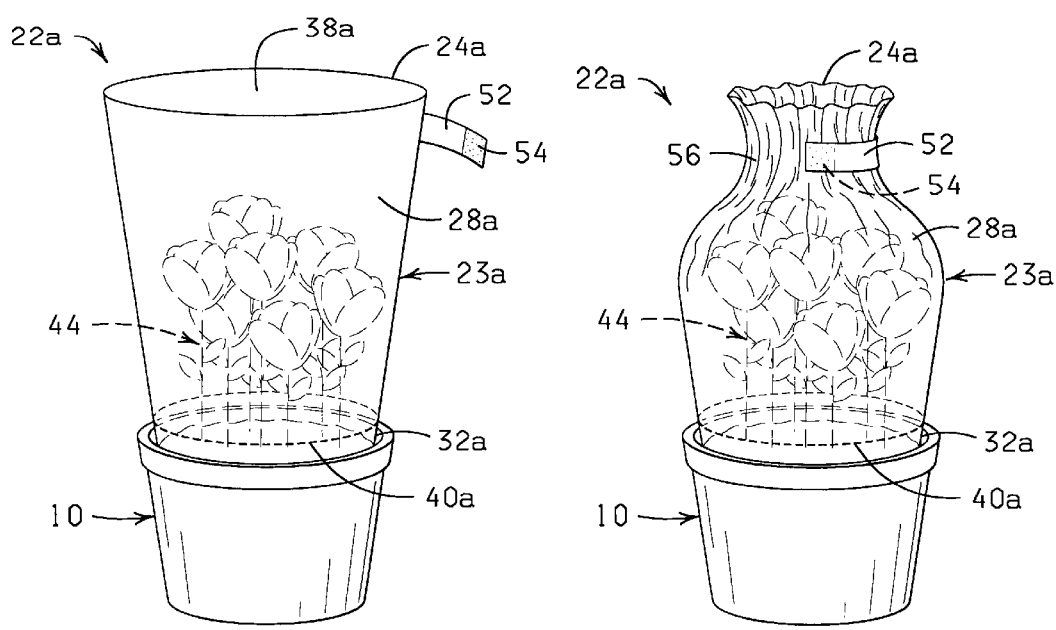
 
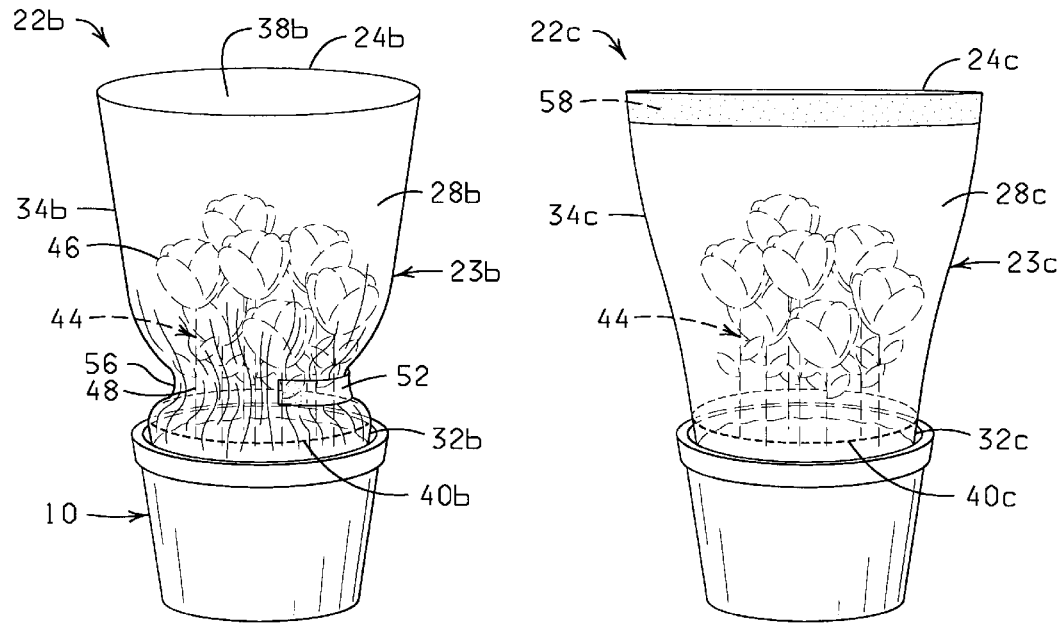
 

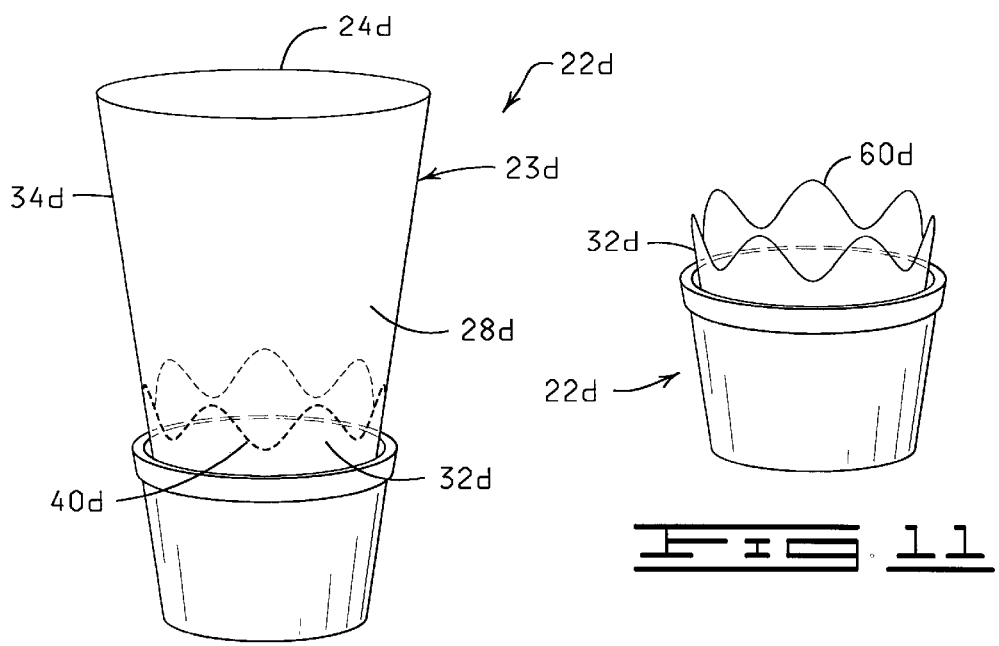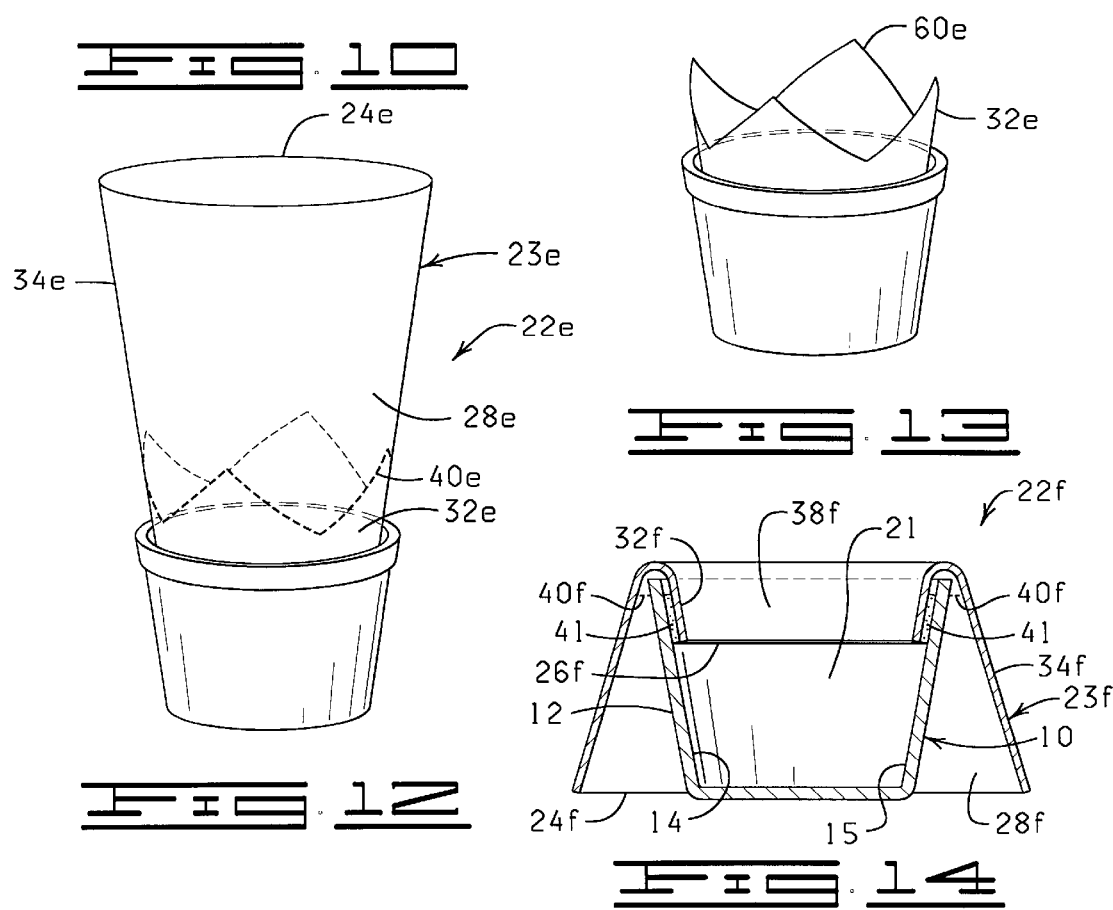

FLOWER POT WITH ATTACHED SLEEVE AND METHOD OF USE

CROSS-REFERENCE TO RELATED APPLICATIONS

The present application is a continuation of U.S. Ser. No. 09/864,387, filed May 24, 2001, now abandoned, which is a continuation-in-part of U.S. Ser. No. 09/732,625, filed Dec. 8, 2000, the specification of each which is hereby expressly incorporated herein by reference in its entirety.

BACKGROUND OF INVENTION

This invention relates to floral containers used to contain or cultivate botanical items and/or growing media, and methods of using same.

BRIEF DESCRIPTION OF THE DRAWINGS

FIG. 1 is a perspective view of a standard pot.

FIG. 2 is a cross-sectional view of a pot assembly constructed of a sleeve and the pot of FIG. 1 in accordance with the present invention.

FIG. 3 is a cross-sectional view of the pot assembly of FIG. 1 with the sleeve positioned downwardly about the pot.

FIG. 4 is a cross-sectional view of the pot assembly of FIG. 1 having a botanical item disposed therein.

FIG. 5 is a cross-sectional view of the pot assembly of FIG. 4 with the sleeve banded about the botanical item.

FIG. 6 is a perspective view of an alternate version of a pot assembly having a sleeve with a closure tab.

FIG. 7 is a perspective view of the pot assembly of FIG. 6 with the closure tab binding a portion of the sleeve about the botanical item.

FIG. 8 is a perspective view of a pot assembly having a sleeve with a closure tab positioned at a lower position upon the sleeve.

FIG. 9 is a perspective view of a pot assembly having a sleeve with a closure bonding material near an upper end of the sleeve.

FIG. 10 is a perspective view of a pot assembly having a sleeve with perforations having a non-linear pattern.

FIG. 11 is a perspective view of the pot assembly of FIG. 10 after an upper portion of the sleeve has been removed.

FIG. 12 is a perspective view of a pot assembly having a sleeve with perforations having an angular pattern.

FIG. 13 is a perspective view of the pot assembly of FIG. 12 after an upper portion of the sleeve has been removed.

FIG. 14 is a cross-sectional view of an alternate pot assembly having a bottomless sleeve wherein a lower portion of the sleeve is attached to a portion of an inner peripheral surface of the pot.

DESCRIPTION OF THE PREFERRED EMBODIMENTS

Shown in FIGS. 1–5 is a pot designated by the general reference numeral 10. The pot 10 is also referred to elsewhere herein as a floral container. The pot 10 refers to any type of container used to hold a botanical item for display, growth, or cultivation. The pot 10 is preferably rigid, or semi-rigid and preferably is a standard grower's pot constructed from ceramic, clay, glass, plastic, wood, natural or synthetic fibers, or foam. The pot 10 has an outer peripheral surface 12, an inner peripheral surface 14 having a side portion 15 and a bottom surface 20, an upper end 16, a bottom end 18, and an inner cavity 21.

The pot 10 constitutes a portion of a pot assembly 22 (FIG. 2). Pot assembly 22 further comprises a tubular sleeve 23. Tubular sleeve 23 (also referred to herein as a sleeve) has an upper end 24, a lower end 26, an outer peripheral surface 28, an inner peripheral surface 30, a lower portion 32, an upper portion 34, a bottom 36, an inner retaining space 38, and a detaching element 40 which in FIGS. 2–5 is shown as a line of perforations. The tubular sleeve 23 is connected to a portion of the inner peripheral surface 14 of the pot 10 by a connecting bonding material 41. The connecting bonding material 41 may connect the tubular sleeve 23 to the side portion 15 of the inner peripheral surface 14, and to the bottom surface 20 of the pot 10, as shown in FIGS. 2–5. Alternatively, the tubular sleeve 23 may be connected only to the side portion 15 of the pot 10, or only to the bottom surface 20 of the pot 10.

The term "detaching element" as used herein, generally means any element or device, or combination of elements, or features, such as, but not by way of limitation, perforations, tear strips, weakened areas, zippers, and any other devices or elements of this nature known in the art, or any combination thereof, which enable the tearing away or detachment of one object from another. Therefore, while perforations are shown and described in detail herein, it will be understood that tear strips, zippers, or any other "detaching elements" known in the art, or any combination thereof, could be substituted therefore and/or used therewith.

The term "bonding material" when used herein means an adhesive material, frequently a pressure sensitive adhesive, or a cohesive material. When the bonding material [41] is a cohesive, a similar cohesive material must be placed on an adjacent surface (of the pot [10] or tubular sleeve [23]) for bondingly contacting and bondingly engaging with the cohesive material. Bonding material [41] may also be a material which is heat sealable and, in this instance, the adjacent portions of the bonding material [41] must be brought into contact and then heat must be applied to effect the seal. Bonding material [41] may include a material which is sonic sealable and vibratory sealable. Bonding material [41] may also be a heat sealing lacquer or hot melt material which may be applied to the tubular sleeve [23] or pot [10] and, in this instance, heat, sound waves, or vibrations, also must be applied to effect the sealing.

The bonding material [41] may be disposed as a strip or block on the outer peripheral surface [28] of the tubular sleeve [23]. The bonding material [41] may also be disposed upon the outer peripheral surface [12] of the pot. Further, the bonding material [41] may be disposed as spots of bonding material, or in any other geometric, non-geometric, asymmetric, or fanciful form, and in any other pattern. The bonding material [41] may be covered by a cover or release strip which can be removed prior to the use of the tubular sleeve [23] and pot [10]. The bonding material [41] can be applied by means known to those of ordinary skill in their art, such as spraying, brushing or stamping.

The upper portion 34 of the tubular sleeve 23 preferably extends a distance beyond the upper end 16 of the pot 10. The upper portion 34 is preferably sized to completely surround and encompass a botanical item 44 which is disposed within the inner retaining space 38 of the tubular sleeve 23, generally along with a growing medium 42 (FIGS. 4 and 5). In a preferred embodiment the botanical item 44 is a standard sized potted plant such as a chrysanthemum, and has a bloom or foliage portion 46 and a stem portion 48.

The detaching element 40 is generally positioned above the upper end 16 of the pot 10, but may also be positioned at the upper end 16, or below the upper end 16. Preferably, the detaching element 40 is horizontally positioned. The upper portion 34 of the tubular sleeve 23, in a preferred embodiment shown in FIG. 3, is downwardly positioned to surround the outer peripheral surface 12 of the pot 10 after the pot assembly 22 has been shipped, or used to cultivate the botanical item 44, or prior to shipment of the pot assembly 22 with the botanical item 44 therein, the upper portion 34 of the tubular sleeve 23 is pulled upwardly about the botanical item 44 to protect and enclose the botanical item 44 (FIG. 4). In an alternative embodiment shown in FIG. 5, the tubular sleeve 23 may be secured about the botanical item 44 by a bonding element 50 which may be a tie, a string, a ribbon, an elastic band, an adhesive or cohesive bonding material disposed upon the tubular sleeve 23, or any other device which can be used to secure the tubular sleeve 23 more closely about the botanical item 44 in a manner well known in the art.

FIGS. 6 and 7 show another embodiment of the present invention, a pot assembly 22a comprising the pot 10 as previously defined and a tubular sleeve 23a which is similar to tubular sleeve 23 herein before described. The tubular sleeve 23a has an upper end 24a, an outer peripheral surface 28a, an inner retaining space 38a, a detaching element 40a, and a closure tab 52 (also referred to herein as a bonding element), having a bonding material 54 thereon. The closure tab 52 can be used to form a crimped portion 56 in an upper portion 34 (FIG. 7) to completely or partially enclose the upper portion 34 of the tubular sleeve 23 about the botanical item 44.

FIG. 8 shows another embodiment of the present invention, a pot assembly 22b having a tubular sleeve 23b which is like tubular sleeve 23a except that the closure tab 52 is positioned lower on an upper portion 34b of the tubular sleeve 23b such that when the closure tab 52 is attached to the tubular sleeve 23b to form a crimped portion 56, the crimped portion 56 is formed at a portion on the tubular sleeve 23b near the stem portion 48 of the botanical item 44, that is, below the crimped portion 56 formed in the tubular sleeve 23a as shown in FIG. 7. Tubular sleeve 23b also has an upper end 24b, an outer peripheral surface 28b, an inner retaining space 38b and a detaching element 40b.

FIG. 9 shows another embodiment of the present invention, a pot assembly 22c having a tubular sleeve 23c similar to tubular sleeve 23 herein before described. The tubular sleeve 23c has an upper end 23c, an outer peripheral surface 28c, an upper portion 34c, a detaching element 40c, and a closure bonding material 58 disposed near the upper end 24c for closing the upper end 24c after the botanical item 44 has been disposed within the pot assembly 22c.

As shown in FIGS. 2–9, the detaching elements 40–40c are horizontally oriented for forming a generally straight upper edge in the lower portions 32–32c of the tubular sleeves 23–23c when the upper portions 34–34c are detached therefrom, respectively.

However, the detaching element 40–40c may have any other orientation or pattern, for forming a decorative border on the lower portions 32–32c. For example, shown in FIGS. 10–13 are two alternative embodiments of the invention. FIG. 10 shows a pot assembly 22d having a tubular sleeve 23d which is similar to the tubular sleeve 23 herein before described except as noted herein after. The tubular sleeve 23d has an upper end 24d, an outer peripheral surface 28d, a lower portion 32d, an upper portion 34d, and a detaching element 40d which has a non-linear pattern or orientation, such as a curved, wavy or sine-wave pattern. When the upper portion 34d of the tubular sleeve 23d is detached from the lower portion 32d thereof, a decorative upper edge 60d is left on the lower portion 32d (FIG. 11).

Similarly, FIG. 12 shows a pot assembly 22e having a tubular sleeve 23e which is similar to the tubular sleeve 22d herein before described except as noted herein after. The tubular sleeve 22e has an upper end 24e, an outer peripheral surface 28e, a lower portion 32e, an upper portion 34e, and a detaching element 40e which has a non-linear pattern or orientation such as an angular or "petal-like" pattern. When the upper portion 34e of the tubular sleeve 23e is detached from the lower portion 32e thereof, a decorative upper edge 60e is left on the lower portion 32e (FIG. 13).

Other non-linear edge configurations will be readily apparent to one of ordinary skill in the art, for example, those shown in FIGS. 2A–2F of U.S. Pat. No. 5,829,225, which is hereby expressly incorporated herein by reference in its entirety.

In yet another alternative embodiment of the invention, shown in FIG. 14, a pot assembly, designated by the general reference numeral 22f, has a tubular sleeve 23f which has an upper end 24f, a lower end 26f, an outer peripheral surface 28f, a lower portion 32f, an upper portion 34f and a detaching element 40f which may be like any of the detaching elements 40–40e described hereinabove. The tubular sleeve 23f is similar to the sleeves 23, 23d and 23e previously described herein except the lower end 26f is completely open and is not completely or partially closed.

The lower portion 32f is connected at its outer peripheral surface 28f via connecting bonding material 41 to the side portion 15 of the inner peripheral surface 14 of the pot 10. An inner retaining space 38f is therefore completely confluent with the inner cavity 21 of the pot 10. The upper portion 34f is shown in FIG. 14 as positioned about the outer peripheral surface 12 of the pot 10, but it will be understood that the upper portion 34f can also be vertically positioned like any of the tubular sleeves described elsewhere herein.

The tubular sleeves 23–23f may be constructed from untreated or treated paper, metal foil, polymeric film such as polypropylene, non-polymeric film, woven or nonwoven synthetic or natural fabric, cardboard, fiber, cloth, burlap, or laminations or combinations thereof.

The term "polymeric film" means a synthetic polymer or a naturally occurring polymer such as cellophane. A polymeric film is relatively strong and not as subject to tearing (substantially non-tearable), as might be the case with paper or foil.

In one embodiment, the tubular sleeves 23–23f may be constructed from a material comprising two polypropylene films. The polypropylene films may be connected together or laminated or may be separate layers. In an alternative embodiment, the tubular sleeves 23–23f may be constructed from only one of the polypropylene films.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquets or floral groupings.

The term "floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping. The floral grouping comprises a bloom or foliage portion and a stem portion. Further, the floral grouping may comprise a growing potted plant having a root portion (not shown) as well. However, it will be appreciated that the floral grouping may consist of only a single bloom or only foliage, or a botanical item, or a propagule. The term "floral grouping" may be used interchangeably herein with the terms "botanical item" and/or "propagule."

The term "propagule" when used herein means any structure capable of being propagated or acting as an agent of reproduction including seeds, shoots, stems, runners, tubers, plants, leaves, roots or spores.

The term "growing medium" when used herein means any liquid, solid or gaseous material used for plant growth or for the cultivation of propagules, including organic and inorganic materials such as soil, humus, perlite, vermiculite, sand, water, foam (solid or particulate) and including the nutrients, fertilizers or hormones or combinations thereof required by the botanical items or propagules for growth.

In a preferred version, the tubular sleeves 23–23f are constructed of a material resistant or impermeable to leakage, while the upper portions 34–34f of the tubular sleeves 23–23f are primarily constructed of a transparent or translucent material, which may or may not be decorative.

Any thickness of material may be utilized to construct the tubular sleeves 23–23f of the present invention as long as the tubular sleeves 23–23f can function in accordance with the present invention and preferably the material will have a thickness in a range from about 0.1 mil to about 30 mils. Often, the thickness of the material utilized to construct the tubular sleeves 23–23f is in a range from about 0.5 mil to about 10 mils, and more preferably, in a range of from about 1.0 mil to about 5 mils.

The sleeves 23–23f may comprise any shape, whether geometric, non-geometric, asymmetrical and/or fanciful as long as they function in accordance with the present invention. The tubular sleeves 23–23f may also be equipped with one or more drainage holes in the lower portions 32–32e thereof or ventilation holes (not shown) in the upper portions 34–34f, or can be made from permeable or impermeable materials.

In another version of the invention, the tubular sleeves 23–23f may have an extended portion comprising a handle for carrying the pot assemblies 22–22f. The pot assemblies 22–22f may further comprise a detaching element for removing the handle at a later time.

It will be appreciated that the examples provided herein are not intended to limit the scope and extent of the claimed invention but are only intended to exemplify various of the embodiments of the invention contemplated herein.

Changes may be made in the construction and the operation of the various components, elements and assemblies described herein or in the steps or the sequence of steps of the methods described herein without departing from the spirit and scope of the invention as defined in the following claims.

What is claimed is:

1. A pot assembly for containing or cultivating a botanical item, comprising:

a pot having an upper end, a bottom end, an outer peripheral surface, an inner peripheral surface, and an inner cavity; and a tubular sleeve having an upper end, a lower end, an inner peripheral surface, and an outer peripheral surface, and wherein a lower portion of the tubular sleeve is disposed within the inner cavity of the pot and adjacent the inner peripheral surface of the pot and wherein at least a portion of the outer peripheral surface of the tubular sleeve is connected to a portion of the inner peripheral surface of the pot, via an adhesive or cohesive bonding material, or heat sealing lacquer or hot melt material, or via a heat sealable, vibratory sealable, or sonic sealable material, and wherein an upper portion of the tubular sleeve extends a distance from the upper end of the pot.

2. The pot assembly of claim 1 wherein the tubular sleeve has a bottom.

3. The pot assembly of claim 2 wherein the bottom of the tubular sleeve is closed.

4. The pot assembly of claim 1 wherein the lower portion of the tubular sleeve is attached to at least one of a side portion and a bottom surface of the inner peripheral surface of the pot.

5. The pot assembly of claim 1 wherein the upper portion of the tubular sleeve is sized to surround and encompass a botanical item disposed within the pot.

6. The pot assembly of claim 1 wherein the upper portion of the tubular sleeve is detachable via a detaching element.

7. The pot assembly of claim 6 wherein the detaching element comprises perforations.

8. The pot assembly of claim 7 wherein the perforations in the tubular sleeve have a linear pattern.

9. The pot assembly of claim 7 wherein the perforations in the tubular sleeve have a non-linear pattern.

10. The pot assembly of claim 1 wherein the tubular sleeve has a closure element for closing the upper end of the tubular sleeve.

11. The pot assembly of claim 1 wherein the tubular sleeve has a bonding element for forming a crimped portion in the tubular sleeve.

12. The pot assembly of claim 1 wherein the upper portion of the tubular sleeve is disposed in a storage position about the outer peripheral surface of the pot.

* * * * *